United States Patent [19]

Feldman et al.

[11] Patent Number: 4,473,444
[45] Date of Patent: Sep. 25, 1984

[54] EXTRACTIVE DISTILLATION OF ALCOHOL-ESTER MIXTURES

[75] Inventors: Julian Feldman; John M. Hoyt, both of Cincinnati, Ohio

[73] Assignee: National Distillers and Chemical Corporation, New York, N.Y.

[21] Appl. No.: 376,322

[22] Filed: May 10, 1982

Related U.S. Application Data

[63] Continuation of Ser. No. 232,795, Feb. 9, 1981, abandoned.

[51] Int. Cl.³ .............................................. B01D 3/40
[52] U.S. Cl. ...................................... 203/69; 203/77; 203/80; 203/91; 560/248
[58] Field of Search ...................... 203/69, 71, 73, 77, 203/80, 91; 560/248

[56] References Cited

U.S. PATENT DOCUMENTS 3,855,078 12/1974 Fredrick et al. ..................... 560/248
3,904,676 9/1975 Curtis .................................. 560/248

Primary Examiner—Frank Sever
Attorney, Agent, or Firm—Kenneth D. Tremain

[57] ABSTRACT

A $C_1$–$C_4$ alkanol and its corresponding acetate or a $C_1$–$C_2$ alkanol and its corresponding propionate are separated by extractive distillation utilizing an aromatic hydrocarbon as the extractive solvent. Transesterification of lower alkanols and lower alkyl acetates or propionates is effected by means of extractive distillation and the preparation of an intermediate ester of a higher boiling alcohol.

11 Claims, 1 Drawing Figure

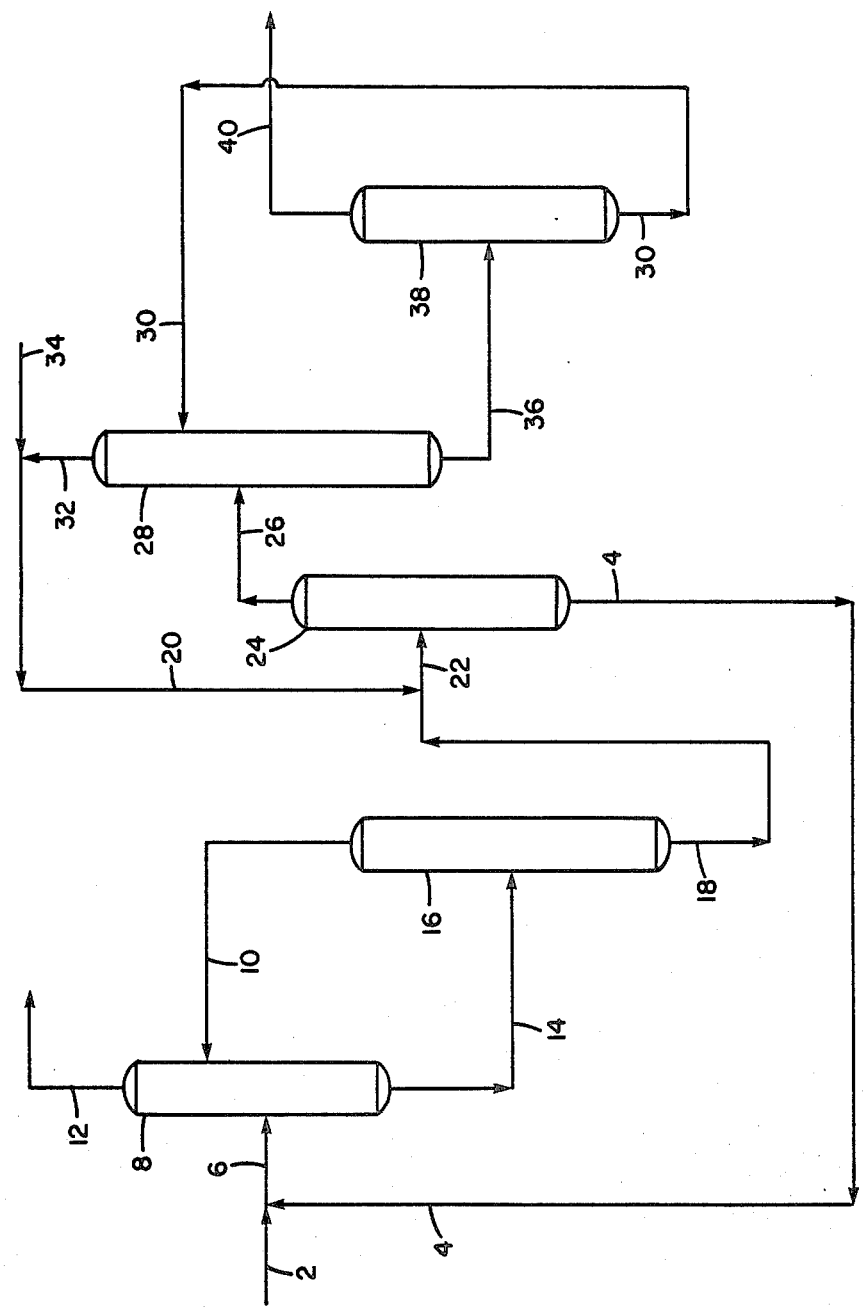

EXTRACTIVE DISTILLATION OF ALCOHOL-ESTER MIXTURES

This is a continuation of application Ser. No. 232,795, filed Feb. 9, 1981, now abandoned.

BACKGROUND OF THE INVENTION

1. Field of the Invention

This invention relates to the use of extractive distillation to separate mixtures of an alcohol and its corresponding ester. More particularly, this invention relates to the separation of an azeotrope of an alcohol and its corresponding ester by means of extractive distillation with a higher boiling extraction agent. This invention especially relates to the separation of a $C_1$-$C_4$ alkanol and its corresponding acetate or a $C_1$-$C_2$ alkanol and its corresponding propionate by means of extractive distillation. In one of its preferred embodiments, this invention relates to the use of extractive distillation to effect the transesterification of a $C_1$-$C_4$ alkanol and a dissimilar $C_1$-$C_4$ alkyl acetate or a $C_1$-$C_2$ alkanol and a dissimilar $C_1$-$C_2$ alkyl propionate.

2. Description of the Prior Art

A mixture of liquids which exhibits a minimum or maximum boiling point is termed an azeotrope. Two liquids, whose boiling points are similar often form an azeotrope. Fractional distillation will not separate an azeotrope into its component. However, azeotropic distillation can often be employed to resolve the mixture. In this technique, a third component which forms an azeotrope with one of the closely boiling components is added, the mixture is subjected to distillation and this second azeotrope is removed as the overhead or the bottoms thereby effecting separation of the original azeotrope components. This third component, called an azeotroping solvent, is usually separated subsequently from the component with which it forms the azeotrope by conventionally known means, such as decanting, and returned to the distillation apparatus for reuse. Each azeotropic separation presents its own special problems so as to render past experience of little value and future results unpredictable. Thus, the selection of an azeotroping solvent is seldom a simple task. Not only must the azeotroping solvent form an azeotrope with the proper volatility but the components of this azeotrope must be capable of being separated subsequently in highly pure form for either reuse in the process or recovery as a final, saleable, useful product. In addition, the azeotroping solvent should be relatively inexpensive, non-toxic, non-reactive and non-corrosive.

Extractive distillation is another means for separating azeotrope forming components and involves the addition of a high-boiling liquid, known as an extractive solvent to alter the relative volatilities of the components of the azeotrope. Altering the volatilities is necessary to effect a separation because of the azeotrope-forming propensity of the components (for illustrative purposes a two component azeotrope will be discussed). The formation of new azeotropes between the extractive solvent and either of the two components is avoided by selecting an extractive solvent which boils far above the feed components. In addition, any troublesome azeotropes in the feed disappear in the presence of the extractive solvent. This absence of azeotropes and the ability to recover the extractive agent by a simple downstream distillation makes extractive distillation a simpler and more useful process than azeotropic distillation for the separation of azeotropes.

In a continuous distillation system, the extractive solvent, which is less volatile than the feed components, is always introduced into the column at an intermediate point between the fresh feed tray and the top of the column. The precise tray for introduction of the extractive solvent into the column is chosen so as to provide sufficient fractionation in the top portion of the column to reduce the concentration of the extractive solvent to a negligible amount in the overhead product.

The number of possible extractive solvents available for a given separation is usually much larger than for an azeotropic distillation in view of the less severe volatility limitations. The only restrictions regarding volatility of a serious nature are that the extractive solvent should have a boiling point sufficiently above that of the components of the feed to prevent the formation of an azeotrope and that the solvent not have a boiling point so high that the sensible-heat requirements for the recovery and recycle of the solvent would be uneconomical.

In the methanolysis of polyvinyl acetate and ethylene-vinyl acetate copolymers, methyl acetate is an unavoidable concomitant. Attempts to convert the methyl acetate to higher acetates by ester interchange (transesterification) with higher alcohols have been unsuccessful because methyl acetate is the most volatile component of the reaction mixture and in addition it forms an azeotrope with methanol which is 81% acetate. This results in the reaction being driven in the opposite direction from that which is desired if fractional distillation is employed as the separation means.

U.S. Pat. Nos. 1,433,308 of Steffens and 1,491,076 of Burghart disclose an ester interchange process for preparing higher acetates such as amyl acetate, from methyl acetate or ethyl acetate and amyl alcohol because the azeotrope of methanol-methyl acetate or ethanol-ethyl acetate can be distilled off to remove the product alcohol from the mixture so as to carry the reaction beyond the equilibrium stage. U.S. Pat. No. 1,980,711 of Bannister et al. discloses the preparation and recovery of butyl acetate from butanol and acetic acid. The azeotrope of butanol and butyl acetate is separated by employing water in a liquid-liquid extraction to selectively extract the butanol since the acetate is relatively insoluble in water. U.S. Pat. No. 1,770,414 of Martin et al employs two immiscible solvents in a liquid-liquid extraction of the reaction mixture formed when ethyl acetate and butyl alcohol are transesterified. Water and a water-immiscible hydrocarbon are added to the reaction mixture where they act as selective solvents, the hydrocarbon taking up the greater proportion of ethyl acetate and butyl alcohol while the water dissolves the ethyl alcohol. As a result, ethanol is removed from the reaction and the desired butyl acetate is obtained.

U.S. Pat. No. 2,605,216 of Adelson et al employs azeotropic distillation to separate an azeotrope of an unsaturated alcohol and the saturated monocarboxylic acid ester of the alcohol. The azeotrope-forming agent employed is an aromatic hydrocarbon, such as benzene. The azeotrope of the alcohol and the hydrocarbon goes overhead while the hydrocarbon-free ester is removed as the bottoms. U.S. Pat. No. 3,855,078 of Friedrich et al discloses the extractive distillation of vinyl acetate from methanol using benzene or naphthalene derivatives as the extractive solvent. German Pat. No. 1,066,584 relates to the extractive distillation of azeotropic mixtures of aliphatic carboxylates and their corresponding alcohols, such as methyl acrylate-methanol, ethyl acrylate-ethanol and methyl propionate-methanol using dicarboxylates, hydrocarbons, ketones or keton esters, such as diethyl oxalate, tetra and decahydronaphthalene, octane, nonane, decane, acetophenone, anisole and methyl or ethyl acetoacetate as the extractive solvent. None of this prior art suggests the extractive distillation of lower alkanols and their corresponding esters using an aromatic hydrocarbon as the extractive solvent.

It is an object of this invention to transesterify lower acetates or propionates, which form azeotropes with their corresponding alkanols, to yield higher acetates or propionates and to recover the higher acetates or propionates in highly purified form.

It is another object of this invention to extractively distill azeotropic mixtures of alkanols and their corresponding acetates or propionates.

SUMMARY OF THE INVENTION

In accordance with the present invention, it has been found that azeotropic mixtures of $C_1$-$C_4$ alkanols and their corresponding acetates as well as azeotropic mixtures of $C_1$-$C_2$ alkanols and their corresponding propionates can be separated in an extractive distillation process employing as an extractive solvent, a hydrocarbon which does not azeotrope with the alkanol and boils at least 25°–30° C. above the higher of the boiling points of the alkanol and its corresponding ester. In this process the alkanol is recovered as the overhead product with the ester and the extractive solvent comprising the bottoms.

This invention may be described as a process of separating a $C_1$-$C_4$ alkanol and its corresponding acetate or a $C_1$-$C_2$ alkanol and its corresponding propionate which comprises:

(a) subjecting a mixture of a $C_1$-$C_4$ alkanol and its corresponding acetate or a $C_1$-$C_2$ alkanol and its corresponding propionate to extractive distillation in the presence of an extractive solvent to produce a first overhead product largely composed of the alcohol and a small amount of the ester and a first bottoms product largely composed of the ester and the extractive solvent, said extractive solvent being an aromatic hydrocarbon which does not form an azeotrope with the alcohol and which has a boiling point at least 25°–30° C. above the higher of the boiling points of the alcohol and its ester, and (b) subjecting the first bottoms product to distillation to produce the ester as the second overhead product and the extractive solvent as the second bottoms product.

The subject invention is also directed to a process of transesterification of a $C_1$-$C_4$ alkanol and a dissimilar $C_1$-$C_4$ acetate which comprises:

(a) subjecting a mixture of (1) $C_1$-$C_4$ alkyl acetate, (2) an aliphatic or an aromatic alcohol, having a boiling point above about 160° C. and (3) an effective amount of a transesterification catalyst to transesterification conditions and extractive distillation in the presence of a first extractive solvent to produce a first overhead product comprising the corresponding alcohol of the $C_1$-$C_4$ alkyl acetate and a small amount of the $C_1$-$C_4$ alkyl acetate and a first bottoms product comprising the acetate of the aliphatic or aromatic alcohol, the transesterification catalyst and the first extractive solvent, said first extractive solvent being a hydrocarbon which does not form an azeotrope with a $C_1$-$C_4$ alkanol and which has a boiling point at least 25°–30° C. above the higher of the boiling points of the $C_1$-$C_4$ alkyl acetate and its corresponding alcohol, (b) subjecting the first bottoms product to fractional distillation to produce a second overhead product comprising the first extractive solvent and a second bottoms product comprising the acetate of the aliphatic or aromatic alcohol and the transesterification catalyst, (c) subjecting a mixture of (1) a $C_1$-$C_4$ alkanol whose number of carbon atoms is dissimilar to that of the alkyl group of the $C_1$-$C_4$ alkyl acetate of step (a) and (2) the second bottoms product to transesterification conditions and fractional distillation to produce a third overhead product comprising a portion of the $C_1$-$C_4$ alkanol of step (c) and the corresponding alkyl acetate of the remaining portion of the $C_1$-$C_4$ alkanol and a third bottoms product comprising the aliphatic or aromatic alcohol and the transesterification catalyst, (d) subjecting the third overhead product to extractive distillation in the presence of a second extractive solvent to produce a fourth overhead product comprising a portion of the $C_1$-$C_{14}$ alkanol of step (c) and a trace of its corresponding acetate and a fourth bottoms product comprising the remaining portion of the corresponding acetate and the second extractive solvent, said second extractive solvent being a hydrocarbon which does not form an azeotrope with a $C_1$-$C_4$ alkanol and which has a boiling point at least 25°–30° C. above the higher of the boiling points of the $C_1$-$C_4$ alkanol and its corresponding acetate, (e) subjecting the fourth bottoms product to fractional distillation to produce a fifth overhead product comprising the acetate of the $C_1$-$C_4$ alkanol of step (c) and a fifth bottoms product comprising the second extractive solvent, and (f) separately recovering the $C_1$-$C_4$ alkanol of the first overhead product and the $C_1$-$C_4$ alkyl acetate of the fifth overhead product as the products of this process.

The subject invention is finally directed to a process of transesterification of a $C_1$-$C_2$ alkanol and a dissimilar $C_1$-$C_2$ propionate which comprises:

(a) subjecting a mixture of (1) $C_1$-$C_2$ alkyl propionate, (2) an aliphatic or an aromatic alcohol, having a boiling point above about 160° C. and (3) an effective amount of a transesterification catalyst to transesterification conditions and extractive distillation in the presence of a first extractive solvent to produce a first overhead product comprising the corresponding alcohol of the $C_1$-$C_2$ alkyl propionate and a small amount of the $C_1$-$C_2$ alkyl propionate and a first bottoms product comprising the propionate of the aliphatic or aromatic alcohol, the transesterification catalyst and the first extractive solvent, said first extractive solvent being a hydrocarbon which does not form an azeotrope with a $C_1$-$C_2$ alkanol and which has a boiling point at least 25°–30° C. above the higher of the boiling points of the $C_1$-$C_2$ alkyl propionate and its corresponding alcohol, (b) subjecting the first bottoms product to fractional distillation to produce a second overhead product comprising the first extractive solvent and a second bottoms product comprising the propionate of the aliphatic or aromatic alcohol and the transesterification catalyst, (c) subjecting a mixture of (1) a $C_1$-$C_2$ alkanol whose number of carbon atoms is dissimilar to that of the alkyl group the $C_1$-$C_2$ alkyl propionate of step (a) and (2) the second bottoms product to transesterification conditions and fractional distillation to produce a third overhead product comprising a portion of the $C_1$-$C_2$ alkanol of step (c) and the corresponding alkyl propionate of the remaining portion of the $C_1$-$C_2$ alkanol and a third bottoms product comprising the aliphatic or aromatic alcohol and the transesterification catalyst, (d) subjecting the third overhead product is extractive distillation in the presence of a second extractive solvent to produce a fourth overhead product comprising a portion of the $C_1$-$C_2$ alkanol of step (c) and a trace of its corresponding propionate and a fourth bottoms product comprising the remaining portion of the corresponding propionate and the second extractive solvent, said second extractive solvent being a hydrocarbon which does not form an azeotrope with a $C_1$-$C_2$ alkanol and which has a boiling point at least 25°-30° C. above the higher of the boiling points of the $C_1$-$C_2$ alkanol and its corresponding propionate, (e) subjecting the fourth bottoms product to fractional distillation to produce a fifth overhead product comprising the propionate of the $C_1$-$C_2$ alkanol of step (c) and a fifth bottoms product comprising the second extractive solvent, and (f) separately recovering the $C_1$-$C_2$ alkanol of the first overhead product and the $C_1$-$C_2$ alkyl propionate of the fifth overhead product as the products of this process.

BRIEF DESCRIPTION OF THE DRAWING

The drawing is a schematic flowplan of an embodiment of the invention.

DESCRIPTION OF THE PREFERRED EMBODIMENTS

The present invention relates to the resolution of azeotropic mixtures of alcohols and esters particularly those found in transesterification processes. The acetates and propionates of the lower alkanols form azeotropes as shown in Table I, below:

TABLE I

| ALCOHOL-ESTER AZEOTROPES | | |
|---|---|---|
| Methanol | B.P., °C. | Wt. % Alcohol |
| Methyl acetate | 53.5 | 19 |
| Methyl propionate | 57.2 | 47.5 |
| Ethanol | | |
| Ethyl acetate | 72 | 31 |
| Ethyl propionate | 78 | 75 |
| Isopropanol | | |
| Isopropyl acetate | 80.1 | 52 |
| Isopropyl propionate | none | — |
| n-Propanol | | |
| n-Propyl acetate | 94.2 | 40 |
| n-Propyl propionate | none | — |
| Isobutanol | | |
| Isobutyl acetate | 107 | 55 |
| Isobutyl propionate | none | — |
| n-Butanol | | |
| n-Butyl acetate | 116 | 63.3 |
| n-Butyl propionate | none | — |

The azeotrope forming alcohol-ester combinations listed above to which the subject invention is directed may be summaried as the $C_1$-$C_4$ alkanols and their corresponding acetates and the $C_1$-$C_2$ alkanols and their corresponding propionates.

Briefly, this invention may be described as subjecting any of the above azeotropes to extractive distillation utilizing an extractive solvent which is an aromatic hydrocarbon having a boiling point at least 25° to 30° C. above the boiling point of the higher boiling component of the azeotrope whereby the alcohol component of the azeotrope forms the overhead from the distillation while the bottoms contains the ester and the aromatic hydrocarbon. By subjecting the bottoms to conventional fractional distillation, the extractive solvent is recovered as the bottoms and is recycled for reuse in the extractive distillation while the ester is recovered as the overhead product.

The extractive solvent selected to effect the desired separation must have a boiling point sufficiently high that neither the alcohol nor the ester component will form an azeotrope with the solvent. In addition, the boiling point of the solvent should not be so high that the sensible-heat requirement of the solvent cycle will become unreasonably or unnecessarily large. It has been found that to extractively distill the alcohol-ester azeotropes to which this invention is directed, an aromatic hydrocarbon having the requisite properties is ideally suited to serve as the extractive solvent. This aromatic hydrocarbon must have a boiling point at least 25° to 30° C. above the higher boiling component of the two component azeotrope which is being resolved. Thus, depending upon the azeotrope involved, such aromatic hydrocarbons as toluene, ethyl benzene, any of the xylenes or mixtures thereof, n-propyl benzene, cumene, any of the butyl benzenes or mixtures thereof and cymene may be employed. Although naphthalene has a boiling point which complies with the requirements of the extractive solvent, it is so high that its sensible heat requirements probably preclude its economic use. Among the aromatic hydrocarbons preferred are xylene, cumene, and cymene.

Those skilled in the art can appreciate that the quantity of extractive solvent employed will be dependent upon the azeotrope involved and the degree of purification desired. Assuming that several trays are provided in the extractive distillation tower above the tray at which the extractive solvent is introduced into the tower, a first approximation for the solvent feed rate into the extractive distillation tower would be one substantially equal to the flow rate of the ester portion of the tower bottoms. Adjustments can be made thereafter depending upon the desired purity of the several streams and the process economics involved.

In general, no special equipment is required other than that generally employed in extractive distillation. Therefore, two distillation columns with the usual attendant equipment, such as condensers, reboilers, reflux systems and the like which are well known in the art will be employed. The first distillation column which will serve as the extractive distillation column should be provided with a solvent feed tray located between the feed tray and the tower overhead. Conveniently, the piping should be so arranged that any of several trays may serve as the solvent feed tray. Generally, the overhead from the extractive distillation tower will be the alcohol with the bottoms comprising the ester and the extractive solvent. The bottoms are usually introduced into the second distillation column, the fractional distillation column, where the ester is taken overhead and the extractive solvent is removed as the bottoms in sufficiently pure condition to be recycled for reuse in the extractive distillation tower. The portion of the rectifying section of the extractive distillation tower between the extractive solvent feed tray and the azeotrope feed tray is known as the extractive section. Here the solvent modifies the volatility of the azeotrope components and extracts the ester from the alcohol. In the upper section of the tower, i.e. above the extractive feed tray, traces of the solvent are removed from the alcohol which is recovered in a highly purified state as the overhead. In the stripping section of the tower traces of the alcohol are removed from the mixture of the solvent and the ester.

In a particularly preferred embodiment this invention, extractive distillation may be employed in a transesterification reaction, especially one where the alcohol portion of the desired ester is only dissimilar to the alkyl portion of the ester feed by only one, two or three carbon atoms. In transesterification, also known as ester interchange or alcoholysis, an ester is reacted with an alcohol in the presence of a catalyst whereby the organic radical portion of the alcohol is exchanged with the alcohol-derived radical of the ester. This reaction does not go to practical completion but rather reaches an equilibrium unless there is a very large excess of the alcohol in the feed or unless some provision is made for removing one of the products from the reaction mixture. Any of the well known ester interchange catalysts may be used, such as sulfuric acid, hydrochloric acid, sodium alcoholate, sodium hydroxide, barium hydroxide and the like.

In view of the azeotrope-forming tendencies of the lower alkyl acetates and propionates, attempts to transesterify such reactants as methyl acetate and ethanol, ethyl acetate and butanol or methyl propionate and ethanol, have not met with any considered measure of success because of the difficulties encountered when trying to remove the desired product by fractional distillation. The number and complexity of azeotropes formed precludes high yields of the desired ester in a pure form. Employing the extractive distillation techniques of this invention on these reaction mixtures will not alleviate the difficulties because of the number of azeotropic combinations present. It has been found, however, that by initially employing a higher boiling alcohol and transesterifying it with the lower alkyl ester, a high yield of the desired ester product may eventually be obtained. In this procedure, the higher boiling alcohol is transesterified with the lower alkyl ester to produce an equilibrium reaction mixture containing the ester of the higher boiling alcohol plus the lower alkyl alcohol in admixture with the reactants. By employing the extractive distillation process of this invention this reaction mixture can be resolved into an overhead of the lower alkyl alcohol and a bottoms of the ester of the higher boiling alcohol plus the extractive solvent. The bottoms is then fractionally distilled to recover the extractive solvent, as the overhead, which is recycled to the initial extractive distillation and a bottoms of the ester of the higher boiling alcohol plus the esterification catalyst. This bottoms stream is then reacted with a lower alkyl alcohol, whose alkyl group is the radical of the desired ester. The resultant reaction mixture contains the higher boiling alcohol and its corresponding ester, the lower alkyl alcohol and its corresponding ester plus the transesterification catalyst. This mixture is fractionally distilled to obtain the lower alkyl alcohol and its ester as the overhead and the higher boiling alcohol and its ester plus the esterification catalyst as the bottoms. The overhead forms an azeotrope which is then subjected to extractive distillation, in accordance with the process of this invention, to obtain the lower alkyl alcohol as the overhead, which is recycled back for further reaction with the ester of the higher boiling alcohol, and a bottoms consisting of the extractive solvent and the desired lower alkyl ester. This bottoms stream is subjected to fractional distillation to yield the extractive solvent as the bottoms which is recycled, and the desired lower alkyl ester recovered as the overhead.

This transesterification, utilizing methyl acetate, benzyl alcohol and ethyl alcohol as illustrative species, may be summarized in the following equations:

Reaction 1  $CH_3COOCH_3$ +

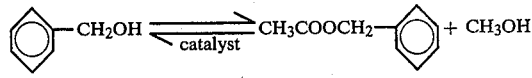

Reaction 2  $CH_3COOCH_2$—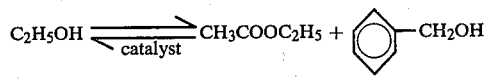

Overall Reaction  $CH_3COOCH_3$ +

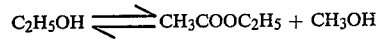

In practicing this transesterification through the use of an intermediate ester of a higher boiling alcohol, it has been found that the higher boiling alcohol must be one which will esterify with the lower alkyl esters and which has a boiling point above about 160° C. to ensure that it will not form azeotropes with the lower boiling alcohols and esters which are formed. The higher boiling alcohol may be aliphatic, aromatic or mixtures thereof, such as 2-methylcyclohexanol, 4-methyl cyclohexanol, heptanol-1, octanol-1, octanol-2 or benzyl alcohol.

It has also been found that this transesterification technique is applicable to $C_1$–$C_4$ alcohols and their acetates and the $C_1$–$C_2$ alcohols and their propionates. In general, this transesterification process may be employed where the alcohol portions of the desired ester and the starting ester are dissimilar by only one to three carbon atoms. Although in the more common application, a higher alkyl ester would be prepared from a lower alkyl ester, the technique is applicable to the reverse situation as well. Thus, in accordance with this invention methyl acetate can be transesterified to n-propyl acetate or n-butyl acetate can be transesterified to yield ethyl acetate.

A preferred embodiment of the extractive distillation process of this invention will be described with reference to the drawing. The drawing is a flowplan of the process. However, only the distillation columns are shown in the flowplan; the condensers, reboilers, reflux systems, pumps, misc. piping, valves and the like are not depicted. Those skilled in the art will appreciate that such attendant equipment will be required and will be utilized as conventional practice dictates. In this process methyl acetate is converted to ethyl acetate utilizing benzyl alcohol as the intermediate reactant and by employing two extractive distillations to separate the acetate-alcohol azeotropes. The methyl acetate feed flows through line 2 where it is combined with benzyl alcohol and the required quantity of a transesterification catalyst which has been recovered in a downstream separation process and has been recycled through line 4. The combined streams flow through line 6 to extractive distillation column 8 where they are introduced onto the fresh feed tray located at an intermediate point in the tower. The operating conditions in column 8 are sufficient to effect a transesterification reaction which produces significant quantities of benzyl acetate and methyl alcohol. The reaction is brought to completion by employing an extractive solvent to separate the azeotrope of methyl alcohol and methyl acetate. Xylene, which functions as the extractive solvent, is introduced into column 8 through line 10 at a point between the fresh feed tray and the tower top. The xylene extracts methyl acetate from the azeotrope causing the methyl alcohol to pass from the extractive distillation column through line 12 as the overhead. The bottoms from extractive distillation column 8 flow through line 14 and consist of benzyl acetate and xylene plus traces of methyl acetate and benzyl alcohol. The bottoms are introduced into distillation column 16 where the stream is separated into an overhead consisting of xylene plus a trace of methyl acetate and a bottoms consisting of benzyl acetate plus the transesterification catalyst. The overhead from column 16 flows through line 10 and is recycled back to extractive distillation tower 8. The bottoms passes from distillation column 16 through line 18. Ethanol, flowing through line 20 is introduced into line 18 where it is combined with the benzyl acetate and the catalyst. This combined stream flows through line 22 and is introduced into distillation column 24 where conditions are maintained for the second transesterification reaction. In column 24, the benzyl acetate reacts with the ethanol to produce the desired ethyl acetate. Distillation column 24 is a conventional fractionating column. No extractive distillation occurs in this column. In fact, extractive distillation would be undesirable in column 24 because it would cause the ethanol to preferentially pass overhead thereby driving the transesterification reaction in the wrong direction. The reaction mixture is fractionally distilled in column 24 with an overhead consisting of ethyl alcohol and ethyl acetate passing from the column through line 26. The bottoms, consisting of benzyl alcohol and the transesterification catalyst, pass from the column through line 4 for recycle and reuse. The overhead from distillation column 24 flows through line 26 and is introduced into extractive distillation column 28 onto the fresh feed tray thereof. The mixture of ethyl alcohol and ethyl acetate is extractively distilled by introducing cumene as the extractive solvent through line 30 at a point intermediate between the fresh feed tray and the tower top. The overhead consisting of ethyl alcohol and a trace of ethyl acetate passes from column 28 through line 32 where it is combined with any required ethanol makeup, introduced through line 34. These combined streams are then recycled back through line 20 for introduction into distillation column 24. The bottoms from extractive distillation column 28 pass from the tower through line 36. This stream consists of cumene plus ethyl acetate and essentially no ethanol. The stream flows through line 36 and is introduced into fractional distillation column 38 where it is separated into a bottoms consisting of cumene which flows from the tower through line 30 for recycle and reuse as the extractive solvent in extractive distillation column 28. The product from the reaction, ethyl acetate, passes from column 38 as the overhead through line 40 for recovery and storage.

The following examples will serve to illustrate the practice of the subject invention.

EXAMPLE I

The vapor-liquid equilibria of methanol-methyl acetate and ethanol-ethyl acetate were measured when an extractive solvent of either xylene or cumene was present.

The methanol-methyl acetate azeotrope had a boiling point of 53.5° C. and contained 19 wt. % alcohol (a 4.26/1 ratio of ester to alcohol) while the ethanol-ethyl acetate azeotrope had a boiling point of 72° C. and contained 31 wt. % alcohol (a 2.2/1 ratio of ester to alcohol).

The relative proportions of the three components were varied in the several runs which were conducted in a Gillespie equilibrium still. At equilibrium, the temperature was observed and samples of the vapor and liquid were obtained. Analysis of the samples was reported on a hydrocarbon-free basis, i.e., on an extractive solvent-free basis.

The results of these tests are presented in Table II below.

TABLE II

| | VAPOR-LIQUID EQUILIBRIA | | | | | | | | | |
|---|---|---|---|---|---|---|---|---|---|---|
| | Mixture No. 1 Methanol Methyl Acetate Xylene | | | | Mixture No. 2 Methanol Methyl Acetate Cumene | | | Mixture No. 3 Ethanol Ethyl Acetate Cumene | | |
| Initial Mixture | | | | | | | | | | |
| Alcohol % | 4.0 | 3.5 | 8 | 12.5 | 3.0 | 7.5 | 12 | 6.2 | 10.7 | 15.2 |
| Ester % | 16.0 | 20.5 | 12 | 11.5 | 17.0 | 16.5 | 16 | 13.8 | 13.3 | 12.8 |
| Hydrocarbon % | 80.0 | 76 | 80 | 76 | 80 | 76 | 72 | 80 | 76 | 72 |
| Boiling Point °C. | 69.7 | 69.1 | 66.1 | 64 | 72.1 | 66.4 | 64.6 | 91.4 | 87.1 | 84.2 |
| Vapor Sample[a] | | | | | | | | | | |
| Alcohol % | 46 | 26 | 64 | 69 | 43 | 55 | 62 | 55 | 66 | 70 |
| Ester % | 54 | 74 | 36 | 31 | 57 | 45 | 38 | 45 | 34 | 30 |
| Liquid Sample[a] | | | | | | | | | | |
| Alcohol % | 25 | 19 | 44 | 61 | 19 | 33 | 50 | 32 | 46 | 55 |
| Ester % | 75 | 81 | 56 | 30 | 81 | 67 | 50 | 68 | 54 | 45 |
| Relative Volatility | 2.6 | 1.7 | 2.3 | 1.1 | 3.2 | 2.5 | 1.6 | 2.6 | 2.3 | 1.9 |

[a]hydrocarbon free basis

These data show that an extractive solvent can be employed to separate the components of these alcohol-ester azeotropes.

EXAMPLE II

A continuous extractive distillation was conducted of a methanol-methyl acetate azeotrope using xylene as the extractive solvent. The distillation column was a 70 plate, 1 in. diameter, Oldershaw column equipped with a vapor-dividing reflux head.

The azeotrope feed was introduced at the 40th plate (from the bottom) and the solvent was introduced at the 60th plate.

The results of the several runs are shown in Table III below.

TABLE III

|  | Run 1 | Run 2 |
| --- | --- | --- |
| Feed rate, ml./min. | 4.5 | 3.5 |
| Solvent rate, ml/min. | 18.4 | 26.5 |
| F/S |  |  |
| Back Pressure, mm | 46 | 50 |
| Reflux Ratio | 15 | 25 |
| Temperatures, °C. |  |  |
| Overhead | 62 | 64 |
| Solvent Plate | 66 | 67 |
| Feed Plate | 65 | 70 |
| Bottoms | 96 | 135–143 |
| Distillate rate, ml/mm | 9 | 0.3 |
| Bottoms effluent rate, ml/min. | 33 | 24 |
| Distillate composition, % |  |  |
| Methanol | 84 | 94, 98.3 |
| Methyl acetate | 12 | 2, 1.7 |
| Xylene | 4 | 4.0, 0 |
| Bottoms composition, % |  |  |
| Methanol | — | 0 |
| Methyl acetate | — | 19 |
| Xylene | — | 81 |

The results demonstrate that the azeotrope composition was broken in the presence of an aromatic hydrocarbon, and that a successful separation of the alcohol from the ester can be made by extractive distillation.

What is claimed is:

1. A process of separating a $C_1$–$C_4$ alkanol and its corresponding acetate or a $C_1$–$C_2$ alkanol and its corresponding propionate which comprises:
    (a) subjecting an azeotrope-forming composition of a $C_1$–$C_4$ alkanol and its corresponding acetate or a $C_1$–$C_2$ alkanol and its corresponding propionate to extractive distillation in the presence of an extractive solvent to produce a first overhead product largely composed of the alcohol and a small amount of the ester and a first bottoms product largely composed of the ester and the extractive solvent, said extractive solvent being an aromatic hydrocarbon which does not form an azeotrope with the alcohol and which has a boiling point at least 25°–30° C. above the higher of the boiling points of the alcohol and its ester, and
    (b) subjecting the first bottoms product to distillation to produce the ester as the second overhead product and the extractive solvent as the second bottoms product.
2. A process according to claim 1 wherein the extractive solvent is xylene, cumene, or cymene.
3. A process according to claim 1, wherein the extractive solvent is toluene, ethyl benzene, n-propyl benzene or a butyl benzene.
4. A process according to claim 1 wherein the alcohol is methanol and the ester is methyl acetate.
5. A process according to claim 1 wherein the alcohol is ethanol and the ester is ethyl acetate
6. A process according to claim 1 wherein the alcohol is n-propanol and the ester is n-propyl acetate.
7. A process according to claim 1 wherein the alcohol is isopropanol and the ester is isopropyl acetate.
8. A process according to claim 1 wherein the alcohol is n-butanol and the ester is n-butyl acetate.
9. A process according to claim 1 wherein the alcohol is isobutanol and the ester is isobutyl acetate.
10. A process according to claim 1 wherein the alcohol is methanol and the ester is methyl propionate.
11. A process according to claim 1 wherein the alcohol is ethanol and the ester is ethyl propionate.

* * * * *